W. MAJOR.
PASSENGER CAR.
APPLICATION FILED DEC. 16, 1911.
1,054,430.
Patented Feb. 25, 1913.
9 SHEETS—SHEET 2.
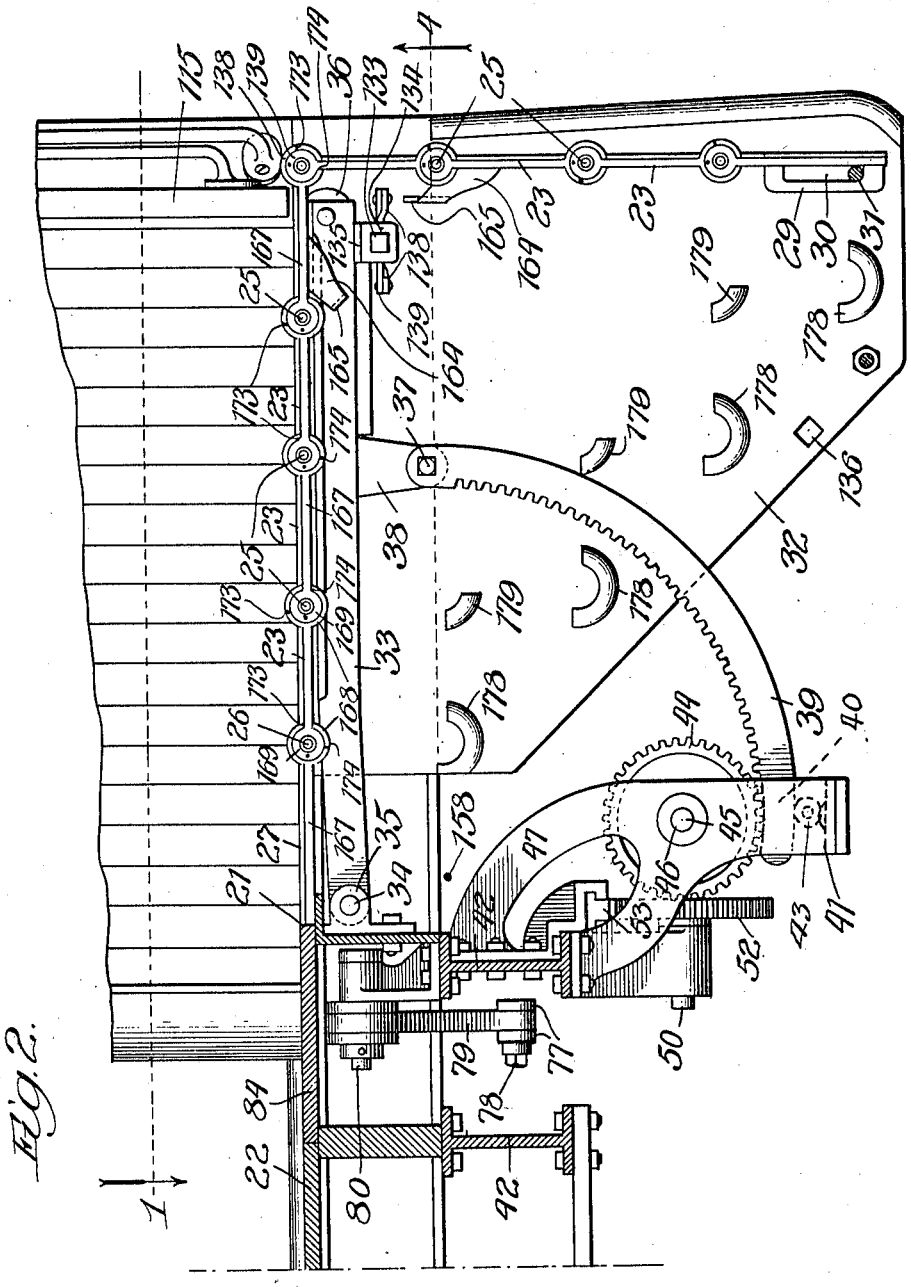
Witnesses:
Inventor:
Wilfred Major,

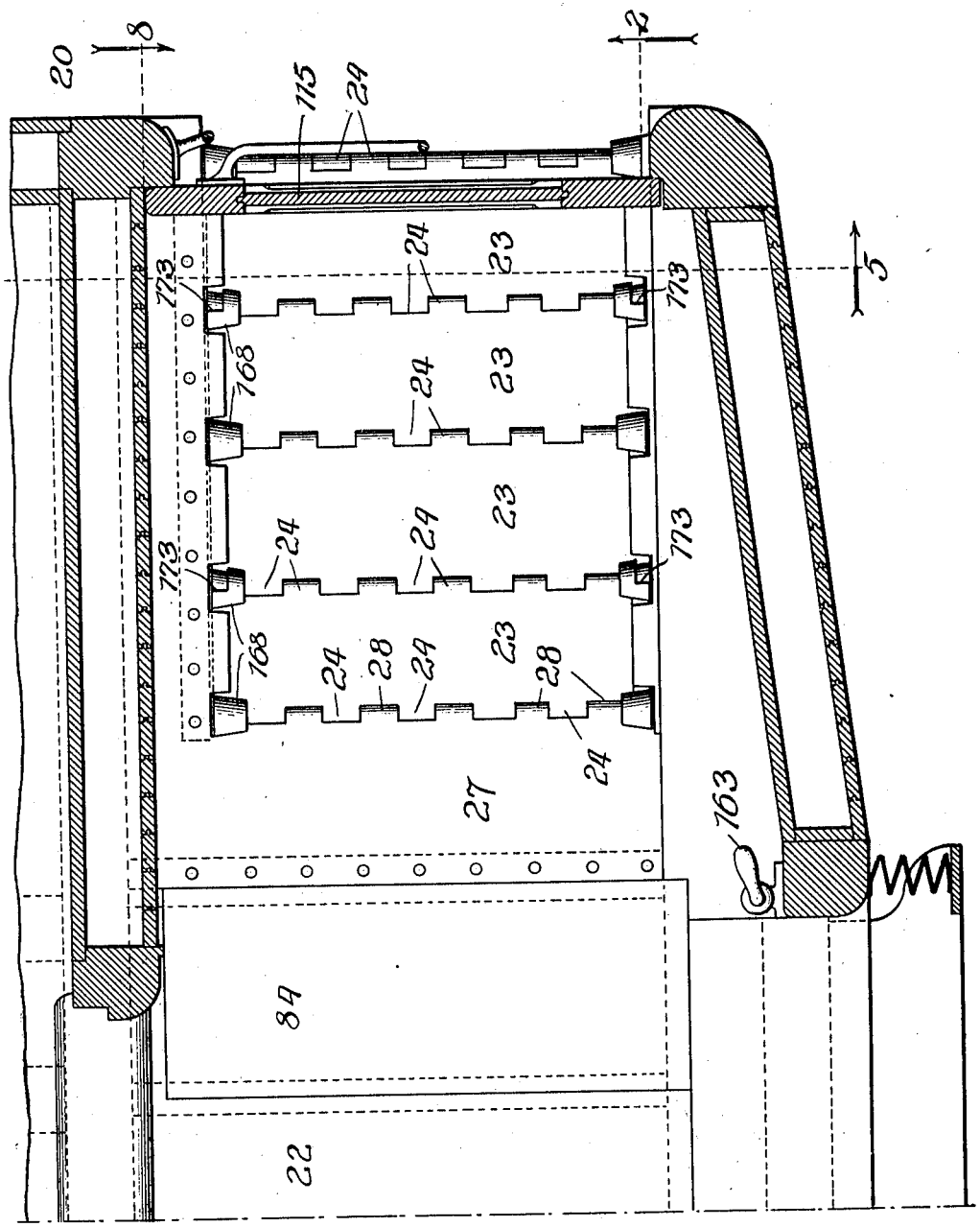

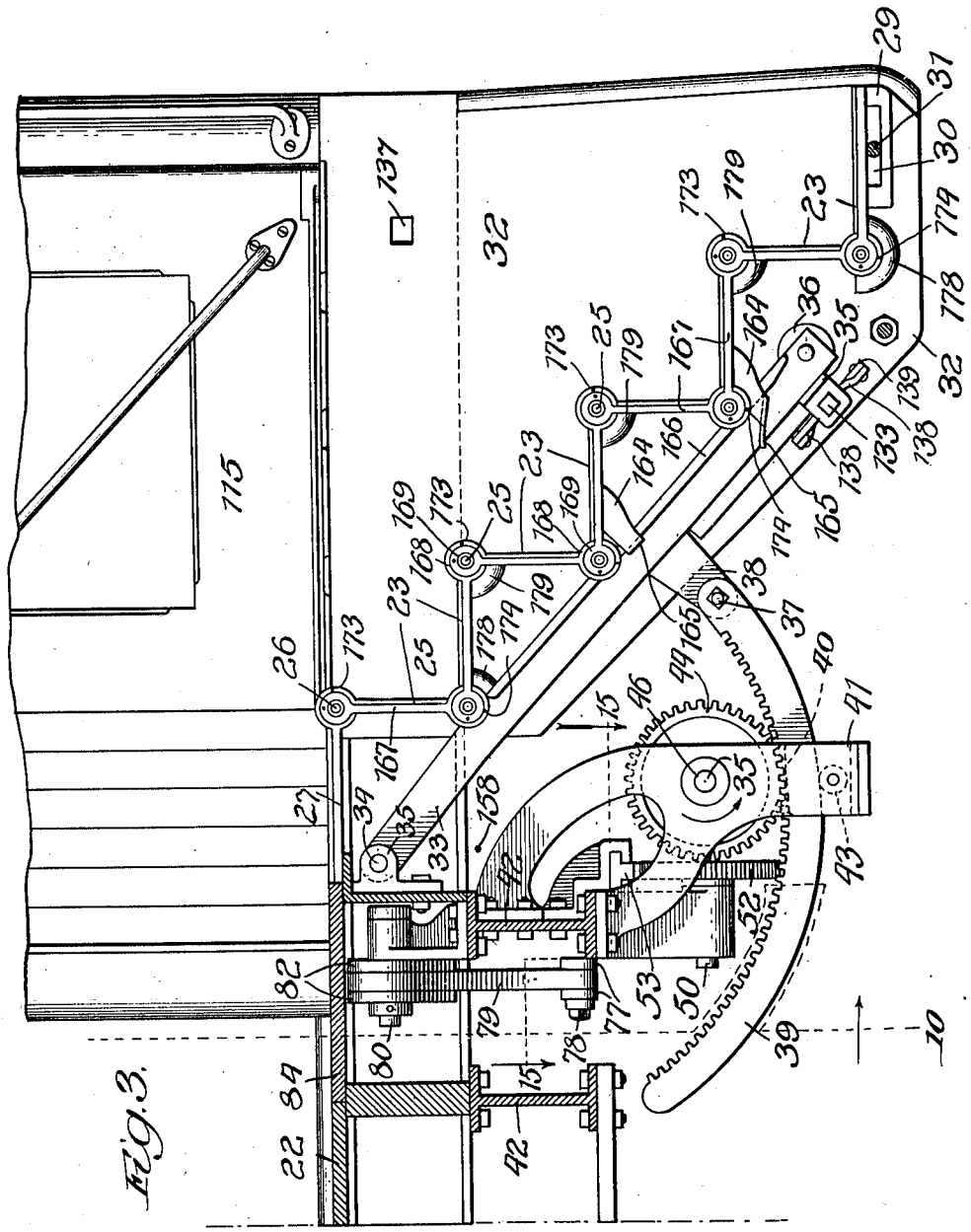

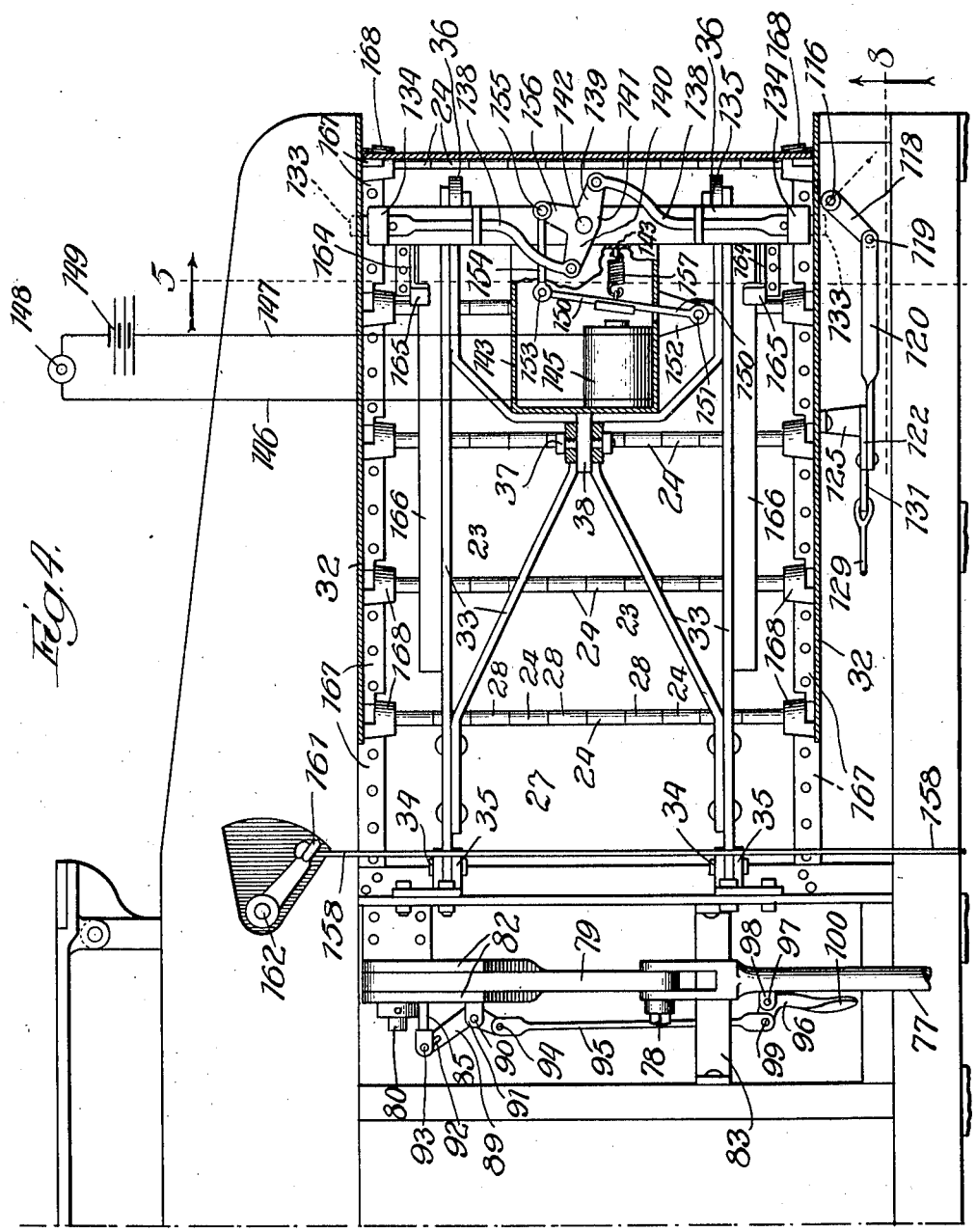

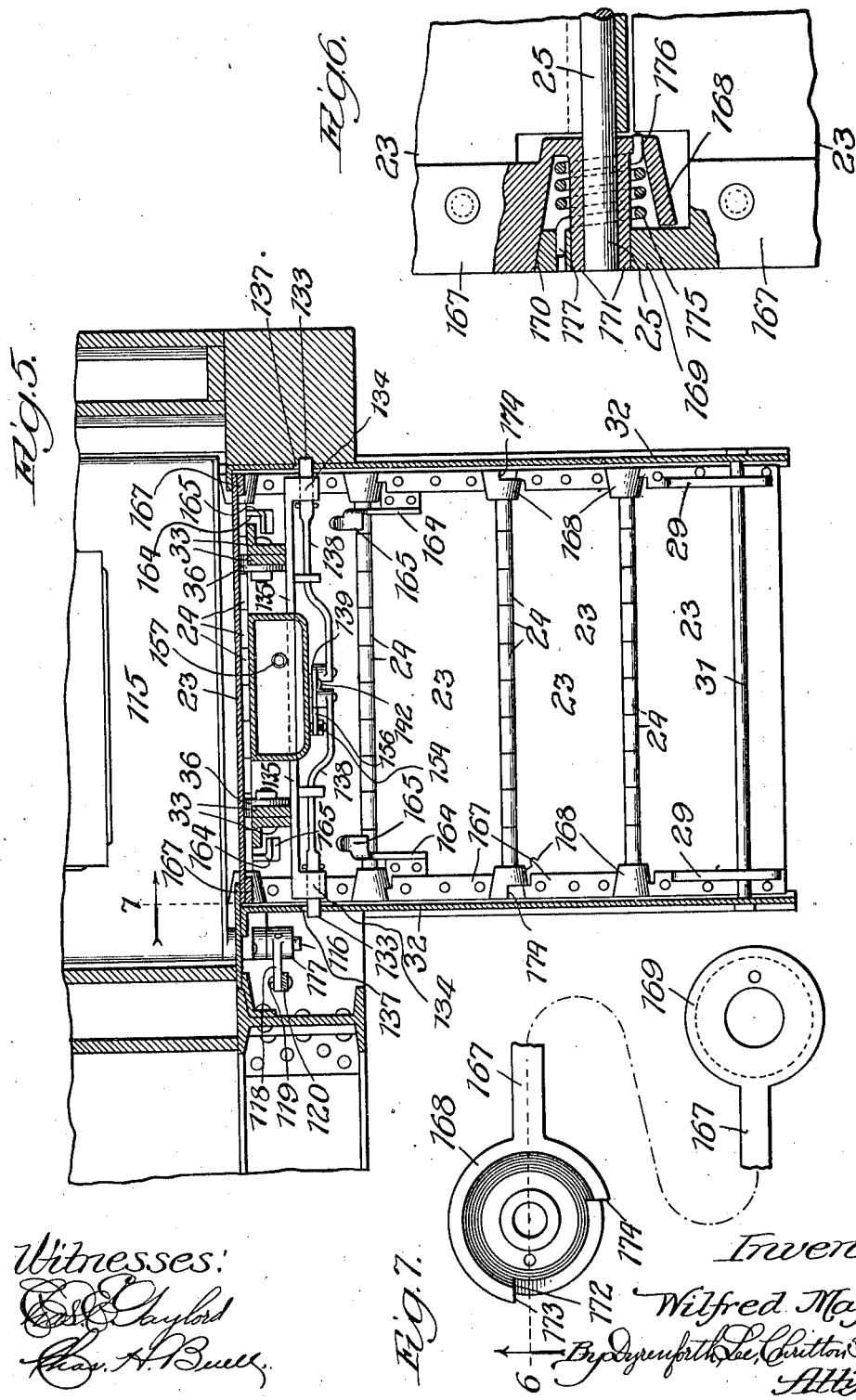

W. MAJOR.
PASSENGER CAR.
APPLICATION FILED DEC. 16, 1911.
1,054,430.
Patented Feb. 25, 1913.
9 SHEETS—SHEET 6.
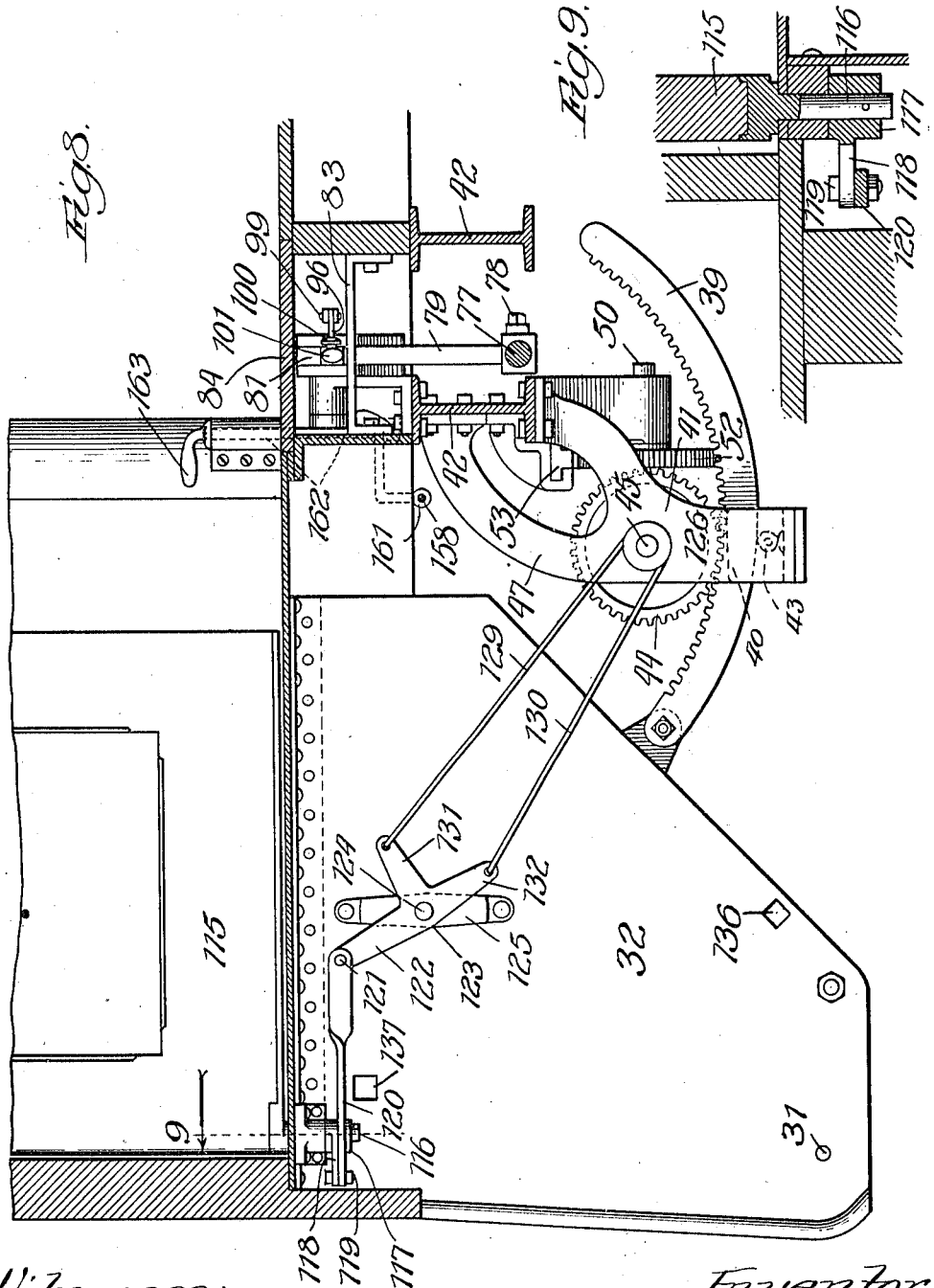
Witnesses:
Inventor:
Wilfred Major,

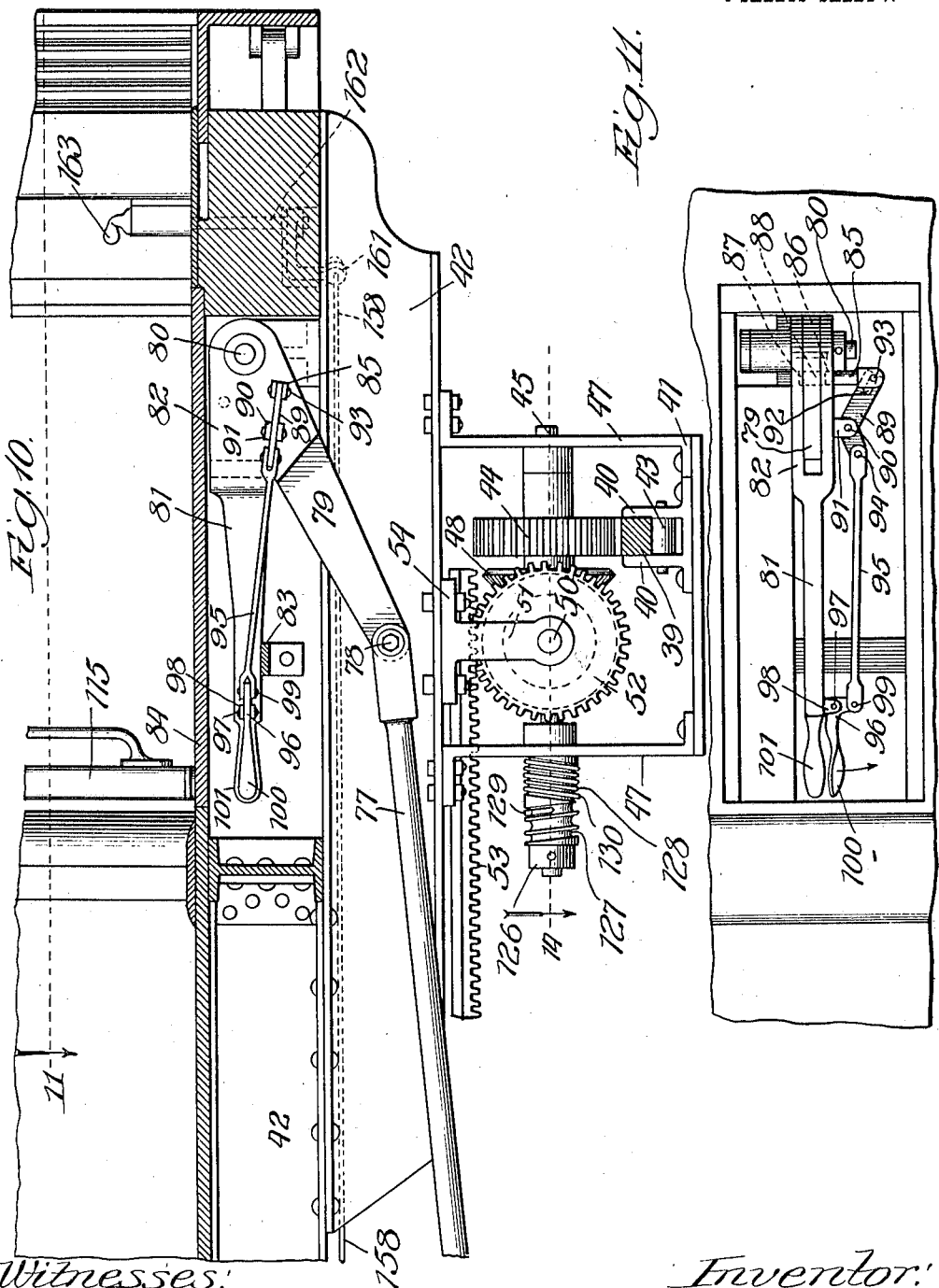

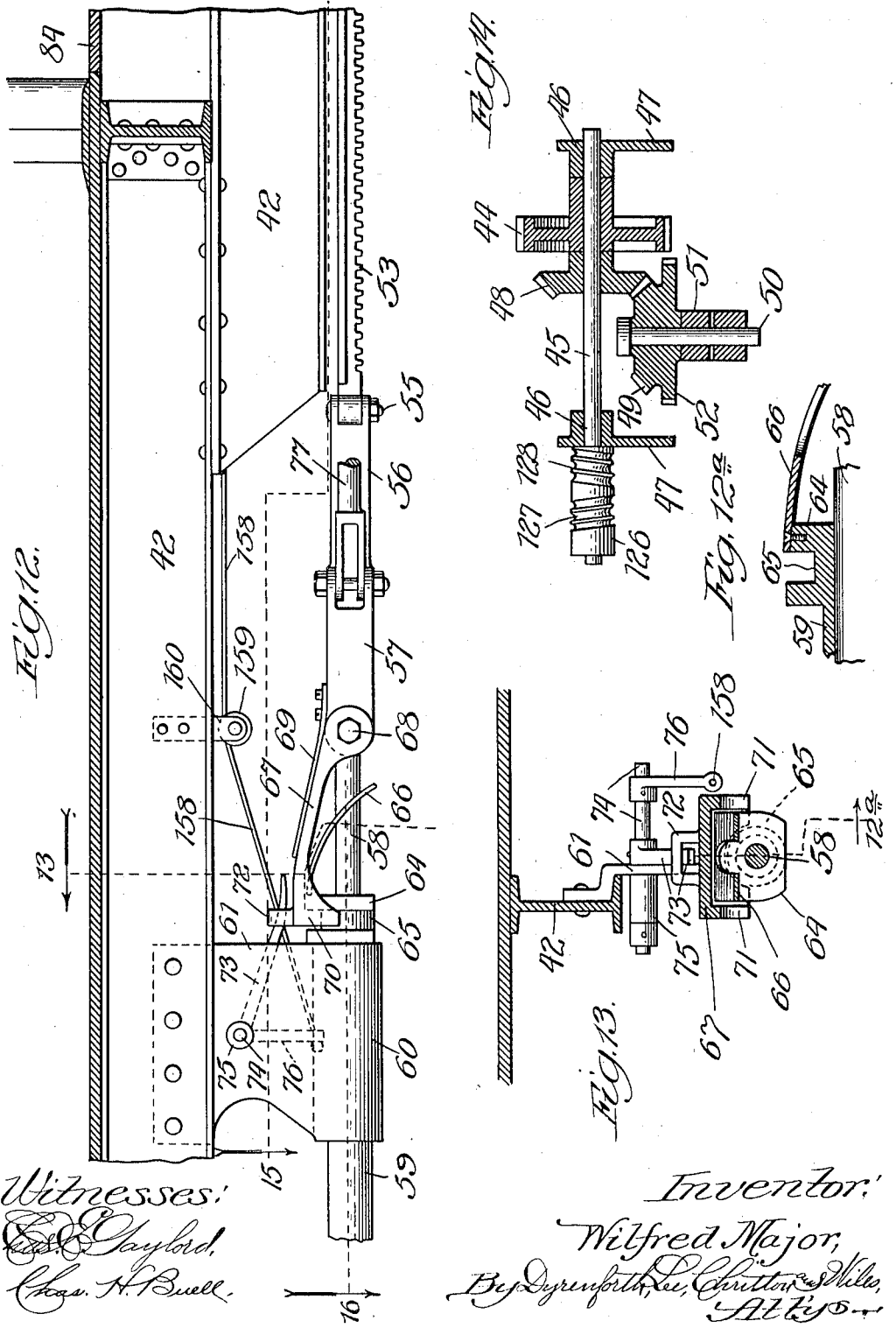

W. MAJOR.
PASSENGER CAR.
APPLICATION FILED DEC. 16, 1911.
1,054,430.
Patented Feb. 25, 1913.
9 SHEETS—SHEET 9.
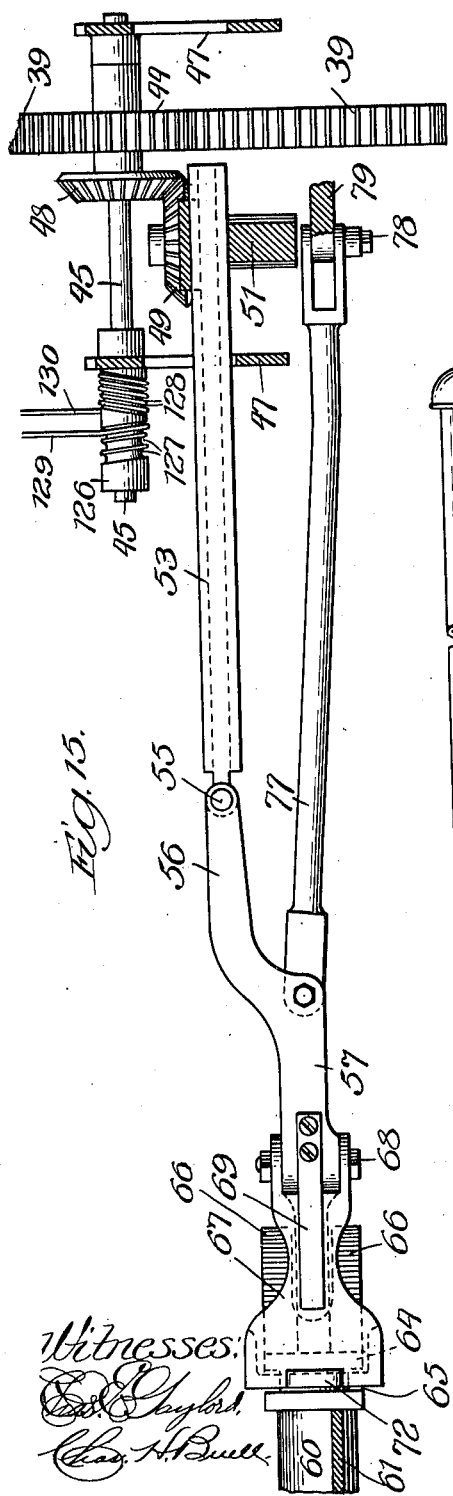
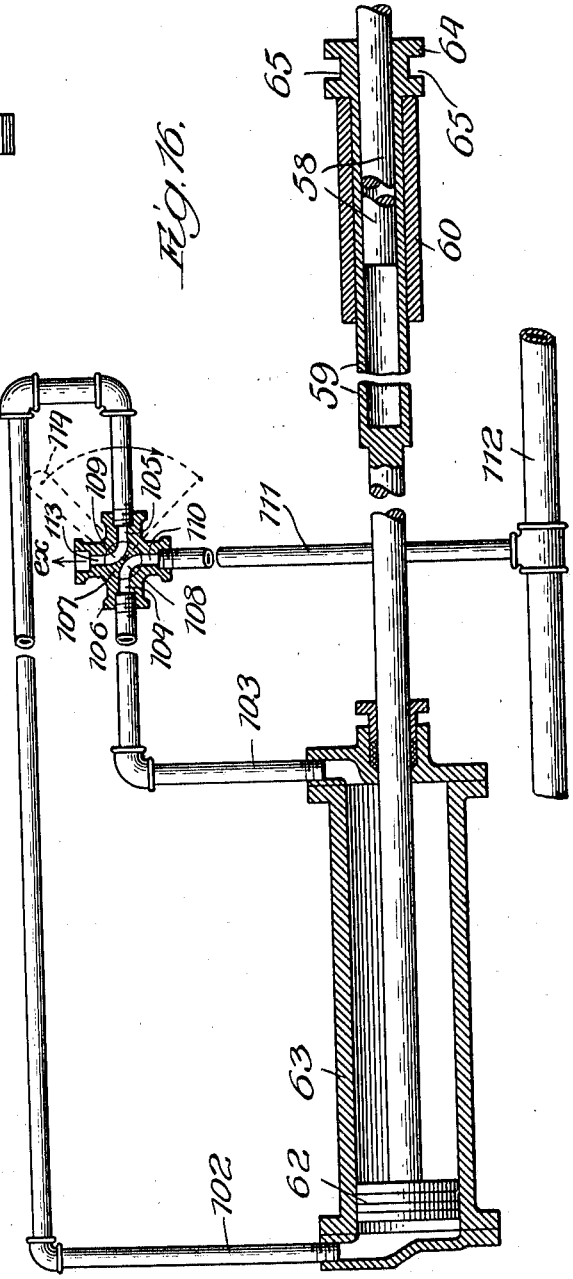
Inventor:
Wilfred Major,

UNITED STATES PATENT OFFICE.

WILFRED MAJOR, OF CHICAGO, ILLINOIS, ASSIGNOR OF ONE-HALF TO AARON MATZDORF, OF CHICAGO, ILLINOIS.

PASSENGER-CAR.

1,054,430.  Specification of Letters Patent. Patented Feb. 25, 1913.

Application filed December 16, 1911. Serial No. 666,293.

*To all whom it may concern:*

Be it known that I, WILFRED MAJOR, a citizen of the United States, residing at Chicago, in the county of Cook and State of Illinois, have invented a new and useful Improvement in Passenger-Cars, of which the following is a specification.

My invention relates to improvements in passenger cars, and, more particularly, to vestibule cars, my objects, generally stated, being to render the steps of the car convertible into platform condition and back to step condition as desired; to provide, in a vestibule car, for the operation of the door associated with the steps, to close the door when the steps are converted into a platform, and vice-versa; to provide for the convenient operation of the members forming the convertible steps and platform; to provide against the accidental displacement of the step and platform forming members; and to accomplish other purposes, as will be manifest from the following description.

My invention is illustrated in its preferred embodiment in the accompanying drawings, in which—

Figure 1 is a plan sectional view of a portion of one end of a car showing one series of steps, which it will be understood are duplicated at each side of the car and at opposite ends thereof, the section being taken at the line 1 on Fig. 2 and viewed in the direction of the arrow, and showing the convertible members for forming the steps and platform in the position they assume when forming an extension of the end platform of the car. Fig. 2 is a section taken at the line 2 on Fig. 1 and viewed in the direction of the arrow. Fig. 3 is a section taken at a line corresponding to the line 2 on Fig. 1, showing the members forming the convertible steps and platform in folded condition for producing steps. Fig. 4 is a section taken at the line 4 on Fig. 2 and viewed in the direction of the arrow. Fig. 5 is a section taken at the lines 5 on Figs. 1 and 4. Fig. 6 is an enlarged broken sectional bottom plan view taken at the line 6 on Fig. 7 and viewed in the direction of the arrow, showing two of the members forming the convertible steps and platform and the tensioning device at their hinge-connection with each other. Fig. 7 is a broken view in end elevation of one of the plurality of said similar convertible members, this view being taken along the line 7 on Fig. 5 and viewed in the direction of the arrow. Fig. 8 is a section taken at the lines 8 on Figs. 1 and 4 and viewed in the direction of the arrow. Fig. 9 is an enlarged broken section taken at the line 9 on Fig. 8 and viewed in the direction of the arrow, this view showing one of the hinge-connections for the vestibule door and a portion of the operating mechanism therefor. Fig. 10 is a broken section taken at the irregular line 10 on Fig. 3 and viewed in the direction of the arrow. Fig. 11 is a broken plan view of the stationary platform of the car shown in Fig. 10 and a portion of the manually operated mechanism located below the plane of the stationary platform of the car, with the removable section of the stationary platform immediately above the said mechanism, removed. Fig. 12 is a broken view taken along an extension of the line 10 on Fig. 2 and forming a continuation of Fig. 10. Fig. 12ª is an enlarged broken sectional view taken at the line 12ª on Fig. 13 and viewed in the direction of the arrow. Fig. 13 is a section taken at the line 13 on Fig. 12 and viewed in the direction of the arrow. Fig. 14 is a section taken at the line 14 on Fig. 10 and viewed in the direction of the arrow. Fig. 15 is a section taken at the lines 15 on Figs. 3 and 12; and Fig. 16, a section taken at the line 16 on Fig. 12 and viewed in the direction of the arrow, this view being a continuation of the structure illustrated in Fig. 12.

In the drawings, I have illustrated a single one of my improved mechanisms located on one side of one end of a vestibule passenger-car represented at 20, though it will be understood that four of these mechanisms will, in usual practice, be provided on a car, two at each end and at opposite sides thereof to correspond with the usual location of steps on the car. The platforms at opposite ends of the car and at opposite sides thereof contain recesses extending transversely of the car as represented of the recess 21 in the stationary platform 22 in Fig. 2, these recesses 21 corresponding with those commonly provided in cars of this character, and into registration with which the steps of the car extend.

In the construction illustrated, the members forming the convertible steps and platform are represented at 23, these members being in the form of plates extending longitudinally of the car and having eyes 24 at opposing edges thereof alternating with each other and through which rods 25 extend for hingedly connecting these members together, the innermost one of the members 23 being hinged on a rod 26 stationarily secured to the platform 22, a plate 27 having eyes 28 along its outer edge which alternate with the eyes 24 on the adjacent one of the members 23 and through which the rod 26 extends, bridging the inner end of the recess 21. The lowermost one of the members 23 is equipped at its under side with members 29 containing slots 30 through which a rod 31, secured at its opposite ends to depending side plates 32, extends, the plates 32 being secured to an end of the stationary platform 22 and flanking the recess 21. It will thus be understood that the members 23 hingedly connected together are hinged at the innermost one of said members at a point in substantial alinement with the stationary platform of the car, and at the outermost one of its members is held to limited transverse displacement by the rod 31, whereby the members 23, in unfolding them as hereinafter described to form the platform-extension, are caused to assume the position illustrated in Fig. 2. Located directly beneath the hinged members 23 is a frame 33 of general rectangular form which is pivoted at its inner end, as indicated at 34, on pivot-lugs 35 provided on the under side of the platform 22, this frame forming the medium through which the members 23 are operated to cause them to become unfolded, preferably in opposition to spring-means hereinafter referred to, and form an extension of the platform 22, when the frame 33 is raised. The frame 33 is equipped at its outer end with rollers 36 which are adapted to bear against the under sides of the adjacent members 23 in the operation of unfolding the latter for the purpose stated.

The following is a description of the means illustrated for raising and lowering the frame 33 for the purpose hereinbefore referred to: Pivotally connected at its outer end, as indicated at 37, to a depending lug 38 on the frame 33 is an arc-shaped rack-bar 39 which is movable in upwardly-extending guides 40 carried by a bracket 41 depending from, and secured to, one of the longitudinally-extending girder-beams 42 of the car, anti-friction rollers 43 being secured in the guides 40 and upon which the rack-bar 39 moves when the latter is operated. The rack-bar 39 meshes with a gear 44 fixed on a shaft 45 journaled, as indicated at 46, in the opposed plate-members 47 of the bracket 41, the shaft 45 being also equipped with a miter gear 48 rigid therewith, this miter-gear meshing with a miter-gear 49 connected with a shaft 50 journaled in a depending member 51 secured to the said girder-beam and carrying a gear 52 which meshes with a straight rack-bar 53 extending longitudinally of the car and in guides 54 supported on said girder-beam lengthwise of the latter. The rack-bar 53 is pivoted at one end, as indicated at 55, to an end of an arm 56 carried by a member 57 having a rod-extension 58 slidable in a sleeve 59 supported and slidable in a bearing 60 on a bracket 61 secured to one of the girder-beams 42, the sleeve 59 terminating at one end in a piston 62 confined in a fluid-pressure cylinder 63 provided with a fluid-pressure control as hereinafter described; said sleeve being provided at its opposite end with a head 64 circumferentially grooved as indicated at 65 and to which a pair of forwardly-extending downwardly-directed arms 66 which straddle the rod 58 are secured. The member 57 carries a locking-device 67 pivoted thereto as indicated at 68 and extending rearwardly. This lock, which is normally downwardly pressed by means of a spring 69, has its rear end bifurcated as indicated at 70 to afford a pair of depending arms 71 adapted to enter the grooves 65 at opposite sides of the head 64 under the action of the spring 69, and is provided on its top with a loop 72 into which the forward end of a lever 73 projects, this lever being fulcrumed, as indicated at 74, on a bearing 75 secured to the under side of the car and provided with a depending arm 76 through the medium of which the lever 73 is adapted to raise the lock 67 to disengage it from the head 64, as and for a purpose hereinafter explained.

The forward end of the member 57 is connected with the rear end of a rod 77, the latter being pivotally connected at its forward end, as indicated at 78, with a forwardly-extending lever 79 which is journaled on a shaft 80 fixed to the car under the platform. The shaft 80 also forms a pivotal support for a lever 81 which is bifurcated as indicated at 82 and straddles the lever 79, the lever 81 serving as the medium through which the mechanism for actuating the frame 33 is operated by hand, and in its normal condition, namely when the members 23 are unfolded to the position shown in Fig. 2, rests against a stop 83 secured to the under structure of the car and extends below the plane of the stationary platform 22, this portion of the platform being formed of a removable section 84 for rendering the lever 81 accessible for operation. The lever 81 is adapted to be releasably connected with the lever 79 by any suitable means, those shown comprising a pin 85 which is slidingly confined in an opening 86 in the lever 81 and is adapted to be projected through openings 87 and 88 in the levers 81 and 79, respectively; a bell-crank lever 89 fulcrumed, as indicated at 90, on spaced lugs 91 carried by the lever 81, the lever 89 containing a slot 92 in its forward end into which a pin 93 on the rod 85 extends and being pivotally connected at 94 to the forward end of a link 95; and a bellcrank lever 96 fulcrumed, as indicated at 97, on lugs 98 carried by the lever 81, the lever 96 being pivotally connected, as indicated at 99, with the rear end of the link 95 and having its opposite end, represented at 100, in the form of a handle which extends closely adjacent to the handle 101 of the lever 81. It will be understood from the foregoing description of the means for locking the levers 79 and 81 together that pressing the handle 100 toward the handle 101 will operate to withdraw the pin 85 from the openings 88 and 87, thereby disconnecting the lever 81 from the lever 79; and that when it is desired to again connect together the levers 79 and 81, the operator will force the handle 100 away from the handle 101, thereby causing the pin 85 to be projected into the openings 87 and 88, it being understood that the lever 81, before such reëngagement takes place, must be in a position in which the openings 86, 87 and 88 aline.

In the construction illustrated, provision is made for the folding and unfolding of the members 23, as stated, and the operation of the vestibule-door, hereinafter described, either manually or otherwise, the particular motive power in the construction shown being fluid-pressure. To this end, the cylinder and piston mechanism, hereinbefore described, is employed, the cylinder 63 communicating at its opposite ends with pipes 102 and 103, which communicate with opposed ports 104 and 105 in the casing of a four-way valve 106, the valve-proper 107 being provided with a pair of curved conduits 108 and 109. The port 110 of the valve-casing 106 communicates with a pipe 111 which communicates with a source of fluid-pressure, for example the train-line 112 forming a part of the fluid-pressure-operated brake system usually employed on cars, and the port 113 of the valve-casing 106 serves as the exhaust. The valve structure described and which is of a well-known form is so constructed that by turning the handle 114 of the valve-device 107, the fluid-pressure from the pipe 112 may be caused to flow into the cylinder through either of the pipes 102 or 103 and exhaust through the other of these pipes to the atmosphere, as will be readily understood from an inspection of Fig. 16, and is well known in the art.

In the construction illustrated, it is desired that the doors at the ends of the car be operated simultaneously with the folding and unfolding of the members 23, to cause the doors to be automatically moved to closed position in the operation of unfolding the members 23 to cause them to extend in platform-producing condition, and to be automatically swung to open position upon the act of folding the members 23 into a condition in which they form steps, and to this end the doors, such as the one represented at 115, are pivoted at one side at their upper and lower ends to the car as illustrated of the lower pivotal connection 116 of the door 115 (Fig. 9), whereby the vestibule doors 115, as is usual in car constructions, may be swung into and out of position for closing the exit and entrance to the car. The lower pivot-member 116 of the door 115 is rigidly connected with a sleeve 117 provided with an arm 118 which is pivotally connected, as indicated at 119, with one end of a rod 120, the opposite end of this rod being pivotally connected, as indicated at 121, with one of the arms 122 of a T-shaped lever 123 fulcrumed on a pin 124 secured to a block 125 on one of the plates 32. The shaft 45 is provided with a sleeve 126 rigid therewith and containing oppositely-extending threads 127 and 128 to which cables 129 and 130 are respectively connected, these cables connecting at their opposite ends with the other arms 131 and 132 of the lever 123.

It will be understood from the foregoing that the cable and lever connections between the door 115 and the shaft 45 operate, when this shaft is rotated, to wind either the cable 129 or 130 upon the threaded portions of the sleeve 126 and unwind therefrom the other of said cables, depending upon the direction in which the shaft 45 is rotated, the arrangement of these parts, with relation to the mechanism hereinbefore described for operating the members 23, being such as to cause the cable 129 to be wound about the sleeve 126 and the cable 130 to be unwound therefrom in the operation of the shaft 45 in a direction to unfold the members 23 to platform-producing condition, thereby swinging the door 115 outwardly for closing the same, and winding up the cable 130 on the sleeve 126 and unwinding the cable 129 therefrom when the shaft 45 is operated to cause the members 23 to fold into step condition, thereby swinging open the door 115.

It is desirable in a construction of this character that releasable means be employed for locking the members 23 in both folded and unfolded condition, and as a desirable means for this purpose I provide the construction illustrated and of which the following is a description: These means, which, in the preferred embodiment of my invention, are electrically operated, comprise a pair of bolts 133 which are guidedly confined in straps 134 secured on extensions 135 provided on the frame-member 33 and are adapted to register with and project into openings 136 in the side plates 32 when the members 23 are folded to form steps, and to register with and project into openings 137 in the side plates 32 when the members 23 and frame 33 are in raised position, in which condition the members 23 form the platform-extension; rods 138 connected with the bolts 133 and pivotally connected at their inner ends with the opposite arms 139 and 140 of a T-shaped lever 141 journaled on a pin 142 secured to a casing 143 on the frame 33, an electro-magnet 145 in the casing 143, the terminals of which are connected through the medium of wires 146 and 147, with an electric push-button 148 which, in practice, would be located at any convenient point on the car, preferably on the end-wall thereof adjacent to the operating lever 81, a battery 149, or other source of electric power, being interposed in the circuit, as for example in the wire 147; an armature 150 pivotally connected at one end, as indicated at 151, with a lug 152 on the the casing 143 and at its opposite end pivotally connected, as indicated at 153, with a link 154, the latter being pivotally connected at its other end, as indicated at 155, with the other arm 156 of the T-shaped lever 141; and a spring 157 connected with the casing 143 and with the armature 150 and tending normally to draw the armature 150 away from the pole of the magnet 145 and force the bolts 133 outwardly for projecting them through the openings 136 and 137 in the plates 32 when these bolts register therewith, it being understood from the foregoing description that when the circuit is closed through the magnet 145, the armature 150 will be attracted to the pole thereof, with the result of withdrawing the bolts 133 from the openings in the side-plates 32 into which they extend, thereby unlocking the members 23 for permitting them to be turned upon their pivotal connections with each other to unfolded or folded condition, as desired.

The operation of the mechanism is as follows:—Assuming the parts to be in the positions illustrated in Figs. 3, 10, 11, 12, 13, 14, 15 and 16, in which the members 23 are folded into a condition in which they afford steps, the vestibule-door is open and the operating lever 81 extends beneath the plane occupied by the stationary portion 22 of the platform, the operator, to unfold the members 23 to produce the platform-extension and close the door 115, assuming that the mechanism is to be operated manually, removes the platform-section 84 to gain access to the lever 81, which latter he swings upwardly to a position in which the pin 85 enters the slots 86 and 88 for locking the levers 79 and 81 together. The next operation to be performed is that of unlocking the members 23 and this is accomplished by the operator pressing the button 148, thereby closing the circuit through the magnet 145, with the result of drawing the armature 150 to the pole-piece of the magnet against the action of the spring 157 and withdrawing the bolts 133 from the openings 136. Simultaneously with the pressing of the button 148 for the purpose stated, the operator swings the lever 81 downwardly, the lock 67 having been preparatorily swung out of engagement with the head 64 by swinging the lever 73 upwardly, as through the medium of a cable 158 running over a pulley 159 journaled on a bearing-member 160 on one of the girder-beams 42 and connected at its opposite end with a crank-arm 161 fixed on a suitably journaled vertically-extending shaft 162 which projects upwardly through the platform of the car and is equipped with an operating-handle 163. Swinging of the lever 81 downwardly as stated operates, through the medium of the lever 79, to cause the rod 77 and member 57 to move the rack 53 forwardly, with the result of operating the gears 52, 49, 48 and 44 in a direction to cause the segmental rack 39 to be swung to the right in Fig. 3. Thus operating the rack 39 causes the frame 33 to be swung upwardly on its pivots 34, with the result of causing the members 23, by reason of their engagement with the upper surface of said frame, to be raised against the action of spring-means hereinafter described, and unfolded into the condition illustrated in Figs. 1 and 2, wherein certain of the members 23 are brought into substantial alinement with the fixed platform 22 and form an extension thereof, and the remainder of said members 23 depend from the outer end of said platform-extension. As soon as the frame 33 has moved to a position in which the members 23 are unfolded to the position just referred to, the bolts 133, which latter during the operation of unfolding the members 23 as stated ride at their outer ends against the inner surfaces of the plates 32, are projected through the openings 137 in these side plates, under the action of the spring 157, thereby locking the members 23 in unfolded condition (Fig. 2). Simultaneously with the unfolding of the members 23 as stated, the door 115 is swung to closed position by the rotation of the sleeve 126, which causes the cables 129 and 130 to be wound thereon and unwound therefrom, respectively, thereby swinging the door on its pivots to closed position through the medium of the lever 123, link 120 and crank 118. The locking of the bolts 133 with the side plates 32 at the openings 137 as described not only serves to hold the members 23 in unfolded condition, but in addition serves to prevent actuation of the mechanism for operating the frame 33 and operating the door, thereby releasably locking the door against opening, and operates to prevent strain against the hereinafter described means for operating the frame 33. The parts of the mechanism are so proportioned that when the lever 81 has been thrown downwardly sufficiently far to unfold the members 23 to the position illustrated in Fig. 2, it will extend below the plane of the stationary section 22 of the platform and, in practice, will preferably be covered by the removable platform-section 84.

When it is desired to open the door 115 and return the members 23 to a position in which they form steps for the car, the operator first actuates the frame-locking devices to withdraw the bolts 133 from the openings 137 in the side-plates 32, by pushing the button 148. Simultaneously with this operation, the operator swings the lever 81 upwardly, with the result of causing the frame 33 to swing downwardly on its pivots 34. The support for the members 23 having been thus removed, they will fold to a condition in which they form steps (Fig. 3), under the action of springs hereinafter described and located at the hinge-connections between said members.

Swinging of the frame 33 downwardly to a position in which the members 23 are folded to form steps as stated, carries the bolts 133 into registration with the openings 136 in the plates 32, into which openings these bolts are automatically projected by the spring 157. In order that the lever 81 shall not obstruct the passageway of the car, it is adapted to be moved to a position in which it extends below the plane of the stationary platform 22 by first disconnecting it from the lever 79 by operating the hereinbefore described mechanism for actuating the pin 85 to cause the latter to be withdrawn from the openings 87 and 88 in the levers 81 and 79, respectively, and thereupon swinging the lever 81 downwardly below the upper surface of the stationary platform 22.

In the operation of folding the members 23 to cause them to assume step form, assuming that the fluid-pressure mechanism illustrated in Fig. 16 is in the condition therein illustrated, namely with the pipe 103 in communication with the pipe 111 and the pipe 102 in communication with the exhaust-port 113 with fluid-pressure operating against the piston 62 to hold it at the limit of its inward movement, the lock 67 rides upon the arms 66 to cause the bifurcated end of this lock to be raised above the plane of the head 64 and bring the loop 72 of the lock into alinement with the forward end of the arm 73, into which loop the lever 73 extends. In the final movement of the lock 67 in moving rearwardly as stated, the lock 65 is projected downwardly under the action of the spring 69 to cause the arms 71 of this lock to extend into the grooves 65 of the head 64, as illustrated in Fig. 12.

In the operation of the mechanism for folding and unfolding the members 23 and swinging the door to open and closed positions by other than manual power, as for example by the piston and cylinder mechanism illustrated in Fig. 16, the lock 67 serves as the means for connecting the piston 62 with the rack 53 for actuating the latter by the reciprocations of the piston. It will be readily understood from the foregoing description and the drawings that when the valve 107 is rotated to cause the pipe 102 to communicate with the source of fluid-pressure through the pipe 111 and the pipe 103 to communicate with the exhaust-port 113, fluid-pressure will be admitted into the rear end of the cylinder 63 behind the piston 62, with the result of causing the rack to be moved to the right in Fig. 10 for swinging the frame 33 upwardly to unfold the steps into platform-producing condition and close the door 115; and when the valve 107 is rotated to the position illustrated in Fig. 16, fluid-pressure will be introduced through the pipe 103 into the front end of the cylinder 63 and in front of the piston 62, with the result of returning the rack 63 to the position illustrated in Fig. 10, thereby causing the members 23 to fold into step condition and effecting the opening of the door 115. It will be understood that in the operation of the door opening and closing and convertible step and platform operating mechanisms, through the medium of the fluid-pressure mechanism described, the described locking mechanism for the frame 33 must first be actuated to withdraw the bolts 133 from those of the openings 136 and 137 in the side plates 32 in which these bolts extend, as will be manifest from the foregoing description.

Should it be desired that the fluid-pressure mechanism be connected up with the rack 53 when the members 23 are unfolded, in which condition the rack will be projected to the right in Fig. 2, and the lock 67 at its bifurcated portion will be out of engagement with the head 64 and be spaced therefrom, the valve 107 will be rotated to cause the fluid-pressure to enter into the rear end of the cylinder 63, thereby forcing the sleeve 59 and the head 64 to the right in Fig. 12, with the result of causing the arms 66 to engage with the lower ends of arms 71 of the lock, the arms 71 riding upon the arms 66 and in the final forward movement of the piston 62 dropping into the groove 65. It will be understood, however, that before the valve 107 is rotated to cause the piston to be forced backwardly for folding the members 23 into step condition, the lever 81 should be disconnected from the lever 79 by withdrawing the pin from engagement with the lever 81 in a manner hereinbefore described.

I prefer to employ spring-means, hereinbefore referred to, tending to fold the members 23 into step-forming condition, and as a desirable form of means for this purpose I provide those illustrated and of which the following is a description: Each of the members 23 is provided at opposite ends with bars 167 secured to the under sides thereof, these bars being provided at their opposite ends with circular heads 168 and 169. The heads 168 contain outwardly-opening annular recesses 170 surrounding sleeve-sections 171 on the heads 168 and through which the respective rods 25, at their ends, extend. The heads 169, which are circular in cross-section, extend into the annular recesses 170 in the adjacent heads 168 as represented in Fig. 6 of the construction therein shown, and are journaled upon the outer ends of the sleeve-sections 171, a portion of the wall of each recess 170 being cut away at an angle somewhat in excess of 90°, as illustrated at 172, in order that the heads 169 and 168 may interfit with each other as described and be relatively movable in the folding and unfolding of the members 23, for the purpose hereinbefore described. The provision of the recesses 172 affords shoulders 173 and 174, certain ones of which engage with the bars 167 adjacent to the heads 169 when the members 23 are unfolded to extend in platform-producing position as represented in Fig. 2, and the other ones of which engage with the bars 167 when the members 23 are folded into a condition in which they form steps as illustrated in Fig. 3. Each of the sleeves 171 is surrounded by a coiled spring 175 which is connected at one end, as indicated at 176, with the head 168 and at its opposite end is connected with the head 169 as represented at 177. Alternate springs 175 at the sides of the convertible step and platform-extension members are wound in opposite directions, and all of these springs are so arranged with relation to the coöperating heads 168 and 169 that when the members 23 are moved from folded position (Fig. 3) to unfolded position (Fig. 2) they will be placed under tension, with the result of causing the members 23 upon the act of lowering the frame 33 to fold into step-condition.

In the preferred construction illustrated, the inner faces of the side plates 32 are equipped with lugs 178 and 179, upon which the members 23 at their heads 168 are adapted to seat when the members 23 fold into step condition, under the action of the springs 175, as illustrated in Fig. 3.

In order that the members 23, when moved into step-condition, be held against accidental displacement, I provide on the under sides of certain of the members 23, at opposite sides thereof, clips 164 having inwardly-directed flanges 165 which overlap flanges on the frame 33, said clips, when the members 23 are in step-condition, fitting closely against the flanges 165 (Fig. 3) and preventing the unseating of the members 23 from the lugs 178 and 179, it being understood that when the member 33 is depressed (Fig. 3) and the members 23 form steps, the bolts 133 are in engagement with the side-plates 32 and thus pressure on the operating mechanism for the members 23 is avoided. The clips 164 also serve, in case any obstruction to the folding of the members 23 is presented, to insure the movement of the members 23 to folded condition upon lowering the frame 33.

The hinged connection of the series of members 23 with the rod 31 operates to hold said series at its lower end, in order that the members 23 properly unfold in opposition to the action of the springs 175, when the frame 33 is raised, to produce the platform-extension and depending section therefor illustrated.

In practice it would be desirable to have the step-and-door operating mechanisms under control of an authorized person, only, on the car, and to this end the push-button mechanism described may be contained in a box (not shown), which would have a removable closure controlled by a lock, or the operation of the push-button may be otherwise controlled, or the control for the air-pressure to the cylinder-mechanism may be under lock and key or both of said mechanisms may be so controlled. In fact, any desirable means which will readily be apparent to any one skilled in the art, may be employed for preventing any other than an authorized person from operating the step-and-door operating mechanisms.

By equipping a car with step-members as described, and especially where they are unfoldable to form a platform-extension and a depending section as illustrated, danger of accidents to persons is greatly minimized when the steps are up and the door closed, as no one can alight from the car and no step is presented at the outside of the car upon which a person can stand. Furthermore, danger of soiling the clothes of passengers entering, or alighting from, the car when the steps are down, is avoided, as no surfaces of the passageway of the car are exposed to the dirt during the running of the train, as distinguished from the condition in vestibule-cars as commonly used, wherein dirt and snow lodge on the steps and the undersides of the trap-doors, which latter, when the exit is open, are thrown back and exposed.

By my improved arrangement, the steps may extend flush with the outer sides of the car, which thus permits the steps to extend lower down than in the case of the cars as usually provided wherein the steps reach a sufficient distance short of the car-sides to render it difficult for one to stand on the steps on the outside of the car when the door is closed, thus causing the steps to reach short of the desired distance from the ground and requiring the use of a stool to aid passengers in alighting.

While I have illustrated and described a specific form of construction constituting an embodiment of my invention, I do not wish to be understood as intending to limit it to such construction, as the same may be variously altered and changed without departing from the spirit of my invention.

What I claim as new, and desire to secure by Letters Patent, is—

1. In a car, the combination of relatively movable members forming steps for the car when in one position and a platform therefor when moved to another position, means for raising said members to platform-forming condition, and electrically-operated means for releasably locking said members in both the step and platform-forming conditions.

2. In a car, the combination of relatively-movable members supported on the car forming steps when in one position and a platform when moved into another position, a pivotally-supported member located beneath said first-named members and having sliding engagement therewith and operating when raised to unfold said members to move them to platform-producing position, and means for operating said last-named member, for the purpose set forth.

3. In a car, the combination of relatively-movable members supported on the car, forming steps when in one position and a platform when moved to another position, a pivotally-supported member operating when raised to move said members to platform-producing condition, means for actuating said pivotally-supported member comprising rack-and-gear mechanism connected with said last-named member, and means for operating said rack-and-gear mechanism, for the purpose set forth.

4. In a car, the combination of relatively-movable members supported on the car, forming steps when in one position and a platform when moved to another position, a pivotally-supported member operating when raised to move said members to platform-producing condition, means for actuating said pivotally-supported member comprising a rack operatively connected with said pivotally-supported member, and gear-mechanism and operating means therefor connected with said rack, for the purpose set forth.

5. In a car, the combination of pivotally connected members supported on the car, forming steps when in one position and a platform when moved to another position, a pivotally-supported member having sliding engagement with said pivoted members and operating when raised to unfold said step-forming members to cause them to assume platform-producing condition, and means for operating said pivotally-supported member, for the purpose set forth.

6. In a car, the combination of relatively-movable members supported thereon forming steps when in one position and a platform when moved into another position, a movable member on the car having sliding engagement with said members and operating when actuated to move said first-named members into platform-forming condition, and locking means carried by said movable member for releasably locking said first-named members in both step and platform condition.

7. In a car, the combination of relatively-movable members supported on the car, forming steps when in one position and a platform when moved to another position, spaced side plates on the car at opposite ends of said members, a movable member on the car having sliding engagement with said members and operating when actuated to move said first-named members to platform condition, and means on said movable member engaging with said side plates for releasably locking said first-named members in both step and platform condition.

8. In a car, the combination of relatively-movable members supported on the car, forming steps when in one position and a platform when moved to another position, a pivotally-supported member on the car below said first-named members and having sliding engagement with the latter and operating when raised to move said first-named members into platform condition, and means coöperating with said pivotally-supported member for insuring the return of said first-named members to step condition when said pivotally-supported member is lowered, for the purpose set forth.

9. In a car, the combination of relatively-movable members supported on the car, forming steps when in one position and a platform when moved to another position, a pivotally-supported member below said first-named members operating when raised to move said first-named members into platform condition, and means carried by said first-named members and coöperating with said pivotally-supported member for insuring the returning of said first-named members to step condition when said pivotally-supported member is lowered.

10. In a car, the combination of relatively-movable members supported on the car, forming steps when in one position and a platform when moved to another position, a pivotally-supported member on the car below said first-named members and having sliding engagement with the latter and operating when raised to move said first-named members into platform condition, and clips carried by said first-named members and extending into the path of downward movement of said pivotally-supported member, for the purpose set forth.

11. In a car, the combination of relatively-movable members supported on the car, forming steps when in one position and a platform when moved to another position, and elastic means tending to move said members into step-forming condition.

12. In a car, the combination of members pivotally connected together and supported on the car, said members forming steps when in one position and a platform when moved to another position, and elastic means tending to fold said members from platform-forming condition into step-forming condition.

13. In a car, the combination of members pivotally connected together and supported on the car, said members forming steps when in one position and a platform when moved to another position, and springs tending to fold said members from platform-forming condition into step-forming condition.

14. In a car, the combination of hingedly-connected members supported on the car, forming steps when in one position and a platform when moved to another position, and springs secured to said members at their hinge connections tending to swing the latter into folded condition, for the purpose set forth.

15. In a car, the combination of hingedly-connected members supported on the car and extending when in one position at angles to each other to form steps composed of treads and risers and when raised unfolding into substantially alining position to form a platform, and coöperating stops on said members operating to prevent collapsing thereof when in either step or platform condition.

16. In a vestibule passenger car, the combination with its door hinged thereto, of relatively-movable members supported on the car forming steps when in one position and a platform when moved into another position, a shaft and operating means therefor, means operatively connected with said shaft for actuating said members when said shaft is rotated, and means operatively connected with said shaft and door for opening and closing the latter, for the purpose set forth.

17. In a vestibule passenger car, the combination with its door hinged thereto, of relatively-movable members supported on the car forming steps when in one position and a platform when moved into another position, a shaft and operating means therefor, means operatively connected with said shaft for actuating said members when said shaft is rotated, cable-means operatively connected with said shaft and means operated by said cable-mechanism for opening and closing said door when said shaft is rotated in opposite directions, for the purpose set forth.

18. In a vestibule passenger car, the combination with its door hinged thereto, of relatively-movable members supported on the car forming steps when in one position and a platform when moved into another position, a shaft and operating means therefor, means operatively connected with said shaft for actuating said members when said shaft is rotated, lever-mechanism on the car eccentrically connected with said door, and means operated by said shaft for operating said lever-mechanism in opposite directions, for the purpose set forth.

19. In a car, the combination of relatively movable members supported on the car forming steps when in one position and a platform when moved into another position, a reciprocable rack-bar on the car, means for reciprocating said rack-bar, gear-mechanism meshing with said rack-bar, and means operated by said gear-mechanism for raising said members to platform-forming condition, for the purpose set forth.

20. In a car, the combination of relatively-movable members supported on the car forming steps when in one position and a platform when moved into another position, a reciprocable member on the car, manually-operated lever-mechanism connected with said member for actuating the latter, and gear-mechanism operatively connected with said reciprocable member for raising said first-named members to platform-forming condition, for the purpose set forth.

21. In a car, the combination of relatively-movable members supported on the car forming steps when in one position and a platform when moved into another position, means through the medium of which said members are raised to platform-forming condition, and manually-operated means and power-operated means for actuating said first-named means, one of said last-named means being releasably connected with said first-named means, for the purpose set forth.

22. In a car, the combination of relatively-movable members supported on the car, forming steps when in one position and a platform when moved into another position, a reciprocable member on the car, means operated by said reciprocable member for raising said first-named members to platform-forming condition, and manually-operated means and power-operated means for actuating said reciprocable member, one of said means having releasable connection with said reciprocable member, for the purpose set forth.

23. In a car, the combination of relatively-movable members supported on the car, forming steps when in one position and a platform when moved into another position, a reciprocable member on the car, means operated by said reciprocable member for raising said first-named members to platform-forming condition, manually-operated means and power-operated means for said reciprocable member, a movable member on the car with which one of said last-named means is operatively connected, and means on said reciprocable member for releasably connecting said movable member and said reciprocable member together in operative relation, for the purpose set forth.

24. In a car, the combination of relatively-movable members supported on the car, forming steps when in one position and a platform when moved into another position, a reciprocable member for raising said first-named members to platform-forming condition, manually-operated mechanism connected with said reciprocable member for operating it, a power-device, and releasable means operatively connecting said power-device with said reciprocable member, for the purpose set forth.

25. In a car, the combination of relatively-movable members supported on the car, forming steps when in one position and a platform when moved into another position, a reciprocable member on the car, means operated by said reciprocable member for raising said first-named members to platform-forming condition, manually-operated mechanism connected with said reciprocable member for actuating the latter, a power-device, a movable member operatively connected with said power-device, and a locking-device carried by said reciprocable member and releasably engaging with said movable member, for the purpose set forth.

26. In a car, the combination of relatively-movable members supported on the car, forming steps when in one position and a platform when moved into another position, a reciprocable member on the car, means operated by said reciprocable member for raising said first-named members to platform-forming condition, manually-operated means connected with said reciprocable member, a power-device having a reciprocable element, and means for releasably connecting said reciprocable element with said reciprocable member in operative relation thereto, for the purpose set forth.

27. In a car, the combination of relatively-movable members supported on the car, forming steps when in one position and a platform when moved into another position, means for raising said first-named members to platform-forming condition, a manually-operated device and a power-operated device, locking-mechanism for releasably, operatively, connecting one of said devices with the said first-named means, and means adjacent to said manually-operated device for operating said locking mechanism.

28. In a car, the combination of relatively-movable members supported on the car, forming steps when in one position and a platform when moved into another position, mechanism through the medium of which said first-named members are actuated, and a lever fulcrumed on the car in an opening in the floor of the latter and releasably connected with said mechanism, and adapted, when released, to lie in said opening to prevent obstruction to the car-platform for the purpose set forth.

29. A car provided with relatively movable members extending when in one position at angles to each other to form steps composed of treads and risers and when raised unfolding into substantially alining condition to form a platform and a depending extension thereof extending at an angle to said platform.

30. A car provided with hingedly-connected members extending when in one position at angles to each other to form steps composed of treads and risers and when raised unfolding into substantially alining condition to form a platform and a depending extension extending at an angle thereto.

31. A car provided with a series of members hingedly-connected together and connected with the car at the upper and lower end of the series thereof, said members extending when in one position at angles to each other to form steps composed of treads and risers and when raised unfolding into substantially alining condition to form a platform and a depending extension of the latter.

32. In a vestibule car, the combination with its hingedly-supported door at the car exit, of relatively movable members supported on the car extending when in one position at angles to each other to form steps composed of treads and risers and when raised unfolding into substantially alining condition to form a platform and a depending extension thereof adjacent to the lower end of said door.

33. In a car, the combination of relatively movable members supported on the car extending when in one position at angles to each other to form steps composed of treads and risers and when raised unfolding into substantially alining condition to form a platform, means having sliding engagement with said members for raising the latter to platform-forming condition, and means for releasably locking said members in said last referred to condition.

34. In a car, the combination of relatively-movable members supported on the car, forming steps for the car when in one position, and a platform therefor when moved to another position, means for raising said members to platform-forming condition, and electrically-operated means for releasably locking said members in platform-forming condition.

35. In a car, the combination with relatively movable members supported on the car extending when in one position at angles to each other to form steps composed of treads and risers and when raised unfolding into substantially alining condition to form a platform, and a pivotally supported member on the car having sliding engagement with said members and operating, when actuated, to move said first-named members to platform-forming condition.

36. In a car, the combination of pivotally connected members extending when in one position at angles to each other to form steps composed of treads and risers and when raised unfolding into substantially alining condition to form a platform, and a pivotally supported member on the car having sliding engagement with said members and operating, when actuated, to move said first-named members to platform-forming condition.

37. In a car, the combination of relatively movable members extending when in one position at angles to each other to form steps composed of treads and risers and when raised unfolding into substantially alining condition to form a platform, movable means on the car having sliding engagement with said members and operating, when actuated, to move said members to platform-forming condition, and locking means carried by said movable member for releasably locking said first-named members in platform-forming condition.

38. In a car, the combination of relatively movable members supported on the car extending when in one position at angles to each other to form steps composed of treads and risers and when raised unfolding into substantially alining condition to form a platform and a depending extension thereof, spaced side plates on the car at opposite ends of said members, and means engageable with said side plates for locking said members in platform-forming condition.

39. In a car, the combination of relatively movable members supported on the car extending when in one position at angles to each other to form steps composed of treads and risers and when raised unfolding into substantially alining condition to form a platform and a depending extension thereof, and means for releasably locking said members against movement.

40. In a vestibule passenger car, the combination with its door movable thereon to open and closed condition, relatively movable members on the car extending when in one position at angles to each other to form steps composed of treads and risers and when raised unfolding into substantially alining condition to form a platform and a depending extension thereof, means for actuating said members, and means for moving said door to cause it to be in open condition when said members are in step condition and in closed condition when said members are in platform-forming condition.

41. In a vestibule passenger car, the combination with its door movable thereon to open and closed condition, relatively movable members supported on the car extending when in one position at angles to each other to form steps composed of treads and risers and when raised unfolding into substantially alining condition to form a platform and a depending extension thereof, means for actuating said members, means operating simultaneously with said member-actuating means for closing the door in the movement of said members to platform-forming condition and opening said door in the movement of said members to step-forming condition.

42. In a car, the combination of relatively movable members supported on the car extending when in one position at angles to each other to form steps composed of treads and risers and when raised unfolding into substantially alining condition to form a platform, and a depending extension at an angle to said platform, and means for moving said members to platform-forming condition.

43. In a car, the combination of hingedly-connected members supported on the car extending when in one position at angles to each other to form steps composed of treads and risers and when raised unfolding into substantially alining condition to form a platform and a depending extension thereof, and means for moving said members to platform-forming condition.

44. In a car, the combination of hingedly-connected members supported on the car forming steps when in one position, and a platform when moved into another position, elastic-means tending to fold said members into step-condition, and means on the car forming seats for said members when in step-condition.

45. In a car, the combination of hingedly-connected members supported on the car forming steps when in one position, and a platform when moved into another position, elastic-means tending to fold said members into step-condition, means on the car forming seats for said members when in step-condition, and means coöperating with said seats for holding said members in seated condition.

46. In a car, the combination of hingedly-connected members supported on the car forming steps when in one position, and a platform when moved into another position, elastic-means tending to fold said members into step-condition, and means for unfolding said members into platform-producing condition in opposition to said elastic-means.

47. In a car, the combination of hingedly-connected members supported on the car forming steps when in one position, and a platform when moved into another position, elastic-means tending to fold said members into step-condition, means for unfolding said members into platform-producing condition in opposition to said elastic-means, and means on said last-named means for holding said first-named members against displacement when in step-forming condition.

48. In a car, the combination of hingedly-connected members supported on the car forming steps when in one position, and a platform when moved into another position, elastic-means tending to fold said members into step-condition, a movable member on the car operating, when raised, to unfold said first-named members into platform-forming condition in opposition to said elastic-means, and means coöperating with said movable member for holding said first-named members against displacement when in step-forming condition.

49. In a car, the combination of hingedly-connected members supported on the car forming steps when in one position and a platform when moved into another position, elastic-means tending to fold said members into step-condition, a movable member on the car operating, when raised, to unfold said first-named members into platform-forming condition in opposition to said elastic-means, means for releasably locking said movable member in lowered condition, and means on said movable member for holding said first-named members against displacement when in step-forming condition.

50. In a car, the combination of hingedly-connected members supported on the car forming steps when in one position and a platform when moved into another position, elastic-means tending to fold said members into step-condition, a pivotally-supported member on the car operating, when swung upwardly, to unfold said first-named members into platform-forming condition in opposition to said elastic-means, and means coöperating with said pivotally-supported member for holding said first-named members against displacement when in step-forming condition.

51. In a car, the combination of hingedly-connected members supported on the car forming steps when in one position and a platform when moved into another position, elastic-means tending to fold said members into step-condition, a pivotally-supported member on the car operating, when swung upwardly, to unfold said first-named members into platform-forming condition in opposition to said elastic-means, means for releasably locking said pivotally-supported member in lowered condition, and means on said pivotally-supported member for holding said first-named members against displacement when in step-forming condition.

52. In a car, the combination of hingedly-connected members supported on the car forming steps when in one position and a platform when moved into another position, elastic-means tending to fold said members into step-condition, means on the car forming seats for said members when in step-condition, a movable member for raising said first-named members to platform-forming condition in opposition to said elastic means, and means coöperating with said movable member when in lowered condition for holding said first-named members in engagement with said seats.

53. In a car, the combination of hingedly-connected members supported on the car forming steps when in one position and a platform when moved into another position, elastic-means tending to fold said members into step-condition, means on the car forming seats for said members when in step-condition, a pivotally-supported member operating, when raised, to move said first-named members to platform-forming condition in opposition to said elastic means, and means coöperating with said pivotally-supported member, when in lowered position, for holding said first-named members in engagement with said seats.

54. In a car, the combination of hingedly-connected members supported on the car forming steps when in one position and a platform when moved into another position, elastic-means tending to fold said members into step-condition, means on the car forming seats for said members when in step-condition, a movable member for raising said first-named members to platform-forming condition in opposition to said elastic means, means coöperating with said movable member, when in lowered position, for holding said first-named members in engagement with said seats, and means for releasably locking said movable member in lowered condition.

55. In a car, the combination of hingedly-connected members supported on the car forming steps when in one position, and a platform when moved into another position, elastic-means tending to fold said members into step-condition, means on the car forming seats for said members when in step-condition, a pivotally-supported member operating, when raised, to move said first-named members to platform-forming condition in opposition to said elastic-means, means coöperating with said pivotally-supported member, when in lowered condition, for holding said first-named members in engagement with said seats.

56. In a car, the combination of hingedly-connected members supported on the car forming steps when in one position and a platform when moved into another position, means on the car forming seats for said members when folded into step-condition, a movable member on the car having sliding engagement with said members and operating, when raised, to move the latter into platform-forming condition, and means operating, when said movable member is lowered, to fold said first-named members into step-condition and into engagement with said seats.

57. In a car, the combination of hingedly-connected members supported on the car forming steps when in one position and a platform when moved into another position, means on the car forming seats for said members when folded into step-condition, a movable member operating, when raised, to move said first-named members into platform-forming condition, means operating, when said movable member is lowered, to fold said first-named members into step-condition and into engagement with said seats, and means coöperating with said seats for holding said first-named members, when in step-condition, in engagement with said seats.

58. In a car, the combination of members hingedly-connected together and hingedly connected with a stationary part of the car at the opposite ends of the series of said members, adjacent to the platform of the car and at a side of the latter below said platform, and forming steps when in one position and a platform and a depending extension of the latter when moved into another position, and means for raising said members into platform-producing condition.

59. In a car, the combination of relatively-movable members supported on the car forming steps when in one position and a platform when moved into another position, means operating, when actuated, to raise said members to platform condition, and manually-operated means and power-operated means for actuating said first-named means, one of said last-named means being releasably-connected with said first-named means, for the purpose set forth.

60. In a vestibule passenger car, the combination of its door hinged thereto, relatively movable members supported on the car extending when in one position at angles to each other to form steps composed of treads and risers and when raised unfolding into substantially alining condition to form a platform and a depending extension thereof, means for actuating said members, and means operating to cause said door to be in open condition when said members are in step condition and to cause said door to be in closed condition when said members are in platform-forming condition.

61. In a vestibule passenger car, the combination of its door hinged thereto, relatively movable members supported on the car extending when in one position at angles to each other to form steps composed of treads and risers and when raised unfolding into substantially alining condition to form a platform and a depending extension thereof, means for actuating said members, and means operating simultaneously with said member-actuating means to close the door in the movement of said members to platform-forming condition and to open the door in the movement of said members to step condition.

62. In a vestibule passenger car, the combination of its door hinged thereto, hingedly-connected members supported on the car extending when in one position at angles to each other to form steps composed of treads and risers and when raised unfolding into substantially alining condition to form a platform and a depending extension thereof, means for actuating said members, and means operatively connected with said member-actuating means for causing said door to be in open condition when said members are in step condition and to cause said door to be in closed condition when said members are in platform-forming condition.

63. In a vestibule passenger car, the combination of its door hinged thereto, relatively movable members supported on the car forming steps when in one position and a platform when moved into another position, means located below said members and having sliding engagement therewith, and means operating to cause said door to be in open condition when said members are in step condition and to cause said door to be in closed condition when said members are in platform condition.

64. In a vestibule passenger car, the combination of its door hinged thereto, hingedly-connected members supported on the car extending when in one position at angles to each other to form steps composed of treads and risers and when unfolding into substantially alining condition to form a platform, a member located beneath said first-named members and slidable thereon for raising said members to platform-forming condition, and means operating to cause said door to be in open condition when said first-named members are in step condition and to cause said door to be in closed condition when said members are in platform-forming condition.

65. In a car, the combination of relatively-movable members on the car forming steps when in one position and a platform and an extension thereof at angles to said platform when moved into another position, and means slidably engaging with said members for moving them to platform-forming condition.

66. In a car, the combination of relatively-movable members on the car forming steps when in one position and a platform and a depending extension thereof extending at an angle to said platform when in another position, and means slidably engaging with said members for moving them to platform-forming condition.

67. In a car, the combination of hingedly-connected members on the car forming steps when in one position and a platform and an extension thereof extending at an angle to the platform when moved into another position, and means slidably engaging with said members for moving them to platform-forming condition.

68. In a car, the combination of members on the car hingedly connected together, said members being hingedly connected with the car at the upper and lower ends of the series thereof and forming steps when in one position and a platform and a depending extension of the latter when moved into another position, and means slidably engaging with said members for moving them to platform-forming condition.

69. In a vestibule car, the combination with its hingedly-supported door at the car-exit, of relatively-movable members supported on the car, forming steps when in one position and when moved into another position forming a platform and a depending extension thereof adjacent to the lower end of said door, means slidably engaging with said members for moving them to platform-forming condition, and means for moving said door to cause it to be in open condition when said members are in step condition and in closed condition when said members are in platform-forming condition.

70. In a car, the combination of relatively-movable members on the car extending when in one position at angles to each other to form steps composed of treads and risers and when raised unfolding into substantially alining condition to form a platform and an extension at angles to the latter when moved into another position, and means having sliding engagement with said members for raising them from step-forming condition into platform-forming condition.

71. In a car, the combination of relatively-movable members on the car extending when in one position at angles to each other to form steps composed of treads and risers and when raised unfolding into substantially alining condition to form a platform and a depending extension thereof extending at an angle to said platform, and means having sliding engagement with said members for raising them from step-forming condition into platform-forming condition.

72. In a car, the combination of hingedly-connected members on the car extending when in one position at angles to each other to form steps composed of treads and risers and when raised unfolding into substantially alining condition to form a platform and an extension extending at an angle thereto, and means having sliding engagement with said members for raising them from step-forming condition into platform-forming condition.

73. In a car, the combination of a series of members on the car hingedly-connected together and connected with the car at the upper and lower end of the series thereof, said members extending when in one position at angles to each other to form steps composed of treads and risers and when raised unfolding into substantially alining condition to form a platform and a depending extension of the latter, and means having sliding engagement with said members for raising them from step-forming condition into platform-forming condition.

74. In a vestibule car, the combination with its hingedly-supported door at the car-exit, of relatively-movable members supported on the car extending when in one position at angles to each other to form steps composed of treads and risers and when raised unfolding into substantially alining condition to form a platform and a depending extension thereof adjacent to the lower end of said door, means having sliding engagement with said members for raising them from step-forming condition into platform-forming condition, and means for moving said door to cause it to be in open condition when said members are in step condition and in closed condition when said members are in platform-forming condition.

75. In a car, the combination of relatively-movable members supported on the car forming steps for the car when in one position and a platform therefor when moved to another position, means slidably engaging with said members for raising the latter to platform-forming condition, and means for releasably locking said members in said last-named condition.

76. In a car, the combination of relatively-movable members supported on the car forming steps when in one position and a platform when moved into another position, and a pivotally supported member on the car having sliding engagement with said members and operating, when actuated, to move said first-named members to platform-forming condition.

77. In a car, the combination of pivotally-connected members supported on the car forming steps when in one position and a platform when moved to another position, and a pivotally-supported member on the car having sliding engagement with said members and operating, when actuated, to move said last-named members to platform-forming condition.

78. In a car, the combination of relatively-movable members supported thereon forming steps when in one position and a platform when in another position, movable means on the car having sliding engagement with said members and operating, when actuated, to move said members to platform-forming condition, and locking means carried by said movable member for releasably locking said first-named members in platform-forming condition.

79. In a car, the combination of relatively-movable members supported on the car forming steps when in one position and a platform when moved to another position, spaced side-plates on the car at opposite ends of said members, movable means on the car having sliding engagement with said members and operating, when actuated, to move the latter to platform-forming condition, and means carried by said first-named means and engageable with said side-plates for locking said first-named members in platform-forming condition.

80. In a car, the combination of relatively-movable members supported on the car forming steps when in one position and a platform when moved into another position, and means on the car having sliding engagement with said members and operating, when raised, to unfold the latter to move them to platform-forming condition.

81. In a car, the combination of hingedly-connected members supported on the car forming steps when in one position and a platform when moved into another position, and means on the car having sliding engagement with said members and operating, when raised, to unfold the latter to move them to platform-forming condition.

82. In a car, the combination of relatively-movable members on the car extending when in one position at angles to each other to form steps composed of treads and risers and when raised unfolding into substantially alining condition to form a platform, and means having sliding engagement with said members, operating, when raised, to move said members to platform-forming condition.

83. In a car, the combination of relatively-movable members supported on the car extending when in one position at angles to each other to form steps composed of treads and risers and when raised unfolding into substantially alining condition to form a platform, a pivotally-supported member on the car slidably engaging with said members, and means for raising said pivotally-supported member, for the purpose set forth.

84. In a car, the combination of pivotally-connected members on the car extending when in one position at angles to each other to form steps composed of treads and risers and when raised unfolding into substantially alining condition to form a platform, and means having sliding engagement with said members operating, when raised, to move said members to platform-forming condition.

85. In a car, the combination of pivotally-connected members on the car extending when in one position at angles to each other to form steps composed of treads and risers and when raised unfolding into substantially alining condition to form a platform, a pivotally-supported member on the car having sliding engagement with said members and operating, when raised, to move said members into platform-forming condition, and means for actuating said pivotally-supported member, for the purpose set forth.

86. In a car, the combination of relatively-movable members on the car extending when in one position at angles to each other to form steps composed of treads and risers and when raised unfolding into substantially alining condition to form a platform, and elastic means tending to move said members into step-forming condition.

87. In a car, the combination of pivotally-connected members supported on the car extending when in one position at angles to each other to form steps composed of treads and risers and when raised unfolding into substantially alining condition to form a platform, and elastic means tending to fold said members into step-forming condition.

88. In a car, the combination of pivotally-connected members supported on the car extending when in one position at angles to each other to form steps composed of treads and risers and when raised unfolding into substantially alining condition to form a platform, seats on the car for said members when folded into step condition, a movable member on the car having sliding engagement with said members and operating, when raised, to move the latter to platform-forming condition, and means operating, when said movable member is lowered, to fold said first-named members into step condition and into engagement with said seats.

89. In a car, the combination of pivotally-connected members on the car extending when in one position at angles to each other to form steps composed of treads and risers and when raised unfolding into substantially alining condition to form a platform, means for actuating said members, and means, independent of said member-actuating means, forming seats for said members when in step condition.

90. In a car, the combination of members pivotally-connected together and pivotally connected with a stationary part of the car at the opposite ends of the series of said members adjacent to the platform of the car and at a side of the latter below said platform, said members extending when in one position at angles to each other to form steps composed of treads and risers and when raised unfolding into substantially alining condition to form a platform and a depending extension of the latter, and means for raising said members into platform-forming condition.

91. In a vestibule passenger car, the combination with its door movable thereon to open and closed condition, relatively-movable members on the car extending when in one position at angles to each other to form steps composed of treads and risers and when raised unfolding into substantially alining condition to form a platform and a depending extension thereof, means for actuating said members, and means for moving said door to cause it to be in open condition when said first-named members are in step condition and in closed condition when said first-named members are in platform-forming condition.

WILFRED MAJOR.

In presence of—
A. U. THORIEN,
R. A. SCHAEFER.